United States Patent
Brunner et al.

(10) Patent No.: US 9,477,138 B2
(45) Date of Patent: Oct. 25, 2016

(54) AUTOFOCUS

(71) Applicant: Apple Inc., Cupertino, CA (US)

(72) Inventors: Ralph Brunner, Cupertino, CA (US); Michael Chin, Belmont, CA (US)

(73) Assignee: Apple Inc., Cupertino, CA (US)

( * ) Notice: Subject to any disclaimer, the term of this patent is extended or adjusted under 35 U.S.C. 154(b) by 504 days.

(21) Appl. No.: 13/914,051

(22) Filed: Jun. 10, 2013

(65) Prior Publication Data

US 2014/0362275 A1  Dec. 11, 2014

(51) Int. Cl.
| | |
|---|---|
| H04N 5/232 | (2006.01) |
| H04N 5/235 | (2006.01) |
| G06K 9/40 | (2006.01) |
| G03B 13/36 | (2006.01) |

(52) U.S. Cl.
CPC .......... *G03B 13/36* (2013.01); *H04N 5/23212* (2013.01); *H04N 5/23216* (2013.01)

(58) Field of Classification Search
CPC ............ H04N 5/23212; H04N 5/2356; G06T 2207/10148; G06T 5/003
USPC ............... 348/345, 349, 362, 208.6; 382/255
See application file for complete search history.

(56) References Cited

U.S. PATENT DOCUMENTS

| | | | |
|---|---|---|---|
| 7,945,151 B2 | 5/2011 | Hirai | |
| 7,995,131 B2 | 8/2011 | Yeh | |
| 8,331,627 B2 | 12/2012 | Xiong | |
| 2006/0028579 A1* | 2/2006 | Sato | 348/362 |
| 2006/0061678 A1* | 3/2006 | Yamazaki | 348/349 |
| 2008/0138055 A1* | 6/2008 | Dunko et al. | 396/89 |
| 2008/0159727 A1* | 7/2008 | Hamamura et al. | 396/104 |
| 2008/0166117 A1* | 7/2008 | Li et al. | 396/121 |
| 2009/0066830 A1* | 3/2009 | Fujii | G02B 7/365 348/345 |
| 2013/0083180 A1* | 4/2013 | Sasaki | H04N 5/23212 348/65 |

FOREIGN PATENT DOCUMENTS

JP  2008139683 A  6/2008

* cited by examiner

*Primary Examiner* — Sinh Tran
*Assistant Examiner* — Xi Wang
(74) *Attorney, Agent, or Firm* — Blank Rome LLP (57) ABSTRACT

Systems, methods, and computer readable media to provide improved autofocus operations are described. In general, techniques are disclosed that show how to improve contrast-based autofocus operations by applying a novel threshold-and-select action to window-specific focus scores. More particularly, techniques disclosed herein may evaluate a multi-window autofocus area over a burst collected group of images. For each captured image, focus scores for each window within an autofocus area may be collected, aggregated and then consolidated to identify a single focus metric and its associated lens position for each window. The window-specific focus scores may be reviewed and selection of a "best" autofocus lens position made using a selection criteria. The specified criteria may be used to bias the selection to either a front-of-plane (macro) or back-of-plane (infinity) focus position.

19 Claims, 11 Drawing Sheets

LENS POSITION

INFINITY →→→→ MACRO

| | 31 | 50 | 68 | 87 | 106 | 124 | 143 | 162 | 180 | 199 | 218 |
|---|---|---|---|---|---|---|---|---|---|---|---|
| 1 | 30,219 | 34,019 | 45,465 | 72,704 | 106,996 | 105,745 | 65,581 | 42,985 | 32,904 | 27,739 | 27,215 |
| 2 | 115,279 | 133,006 | 167,003 | 241,163 | 333,869 | 381,815 | 357,990 | 290,816 | 209,920 | 152,780 | 126,179 |
| 3 | 216,246 | 247,489 | 326,291 | 460,435 | 593,715 | 673,655 | 687,877 | 587,662 | 461,687 | 328,931 | 239,661 |
| 4 | 267,923 | 296,004 | 371,165 | 500,758 | 638,429 | 695,387 | 644,915 | 521,398 | 406,300 | 310,545 | 246,870 |
| 5 | 314,094 | 357,899 | 442,049 | 583,907 | 677,933 | 692,019 | 635,198 | 514,685 | 409,691 | 325,950 | 266,968 |
| 6 | 265,420 | 293,569 | 346,339 | 401,817 | 459,980 | 538,100 | 612,761 | 619,906 | 568,137 | 503,785 | 437,703 |
| 7 | 188,962 | 208,213 | 243,256 | 284,148 | 336,327 | 410,191 | 486,946 | 501,828 | 449,968 | 370,096 | 293,683 |
| 8 | 286,560 | 323,037 | 373,828 | 441,161 | 552,436 | 682,257 | 776,055 | 769,865 | 682,166 | 547,612 | 430,717 |
| 9 | 206,165 | 231,219 | 286,014 | 384,659 | 522,308 | 625,618 | 682,985 | 648,851 | 565,384 | 436,565 | 322,514 |
| 10 | 154,259 | 177,311 | 216,905 | 290,133 | 411,943 | 517,779 | 547,771 | 503,330 | 416,836 | 309,657 | 229,148 |
| 11 | 153,372 | 166,593 | 198,906 | 240,640 | 287,334 | 357,344 | 430,535 | 467,285 | 442,504 | 394,558 | 351,527 |
| 12 | 196,266 | 211,803 | 253,178 | 326,610 | 419,840 | 516,937 | 637,747 | 740,966 | 740,807 | 633,082 | 481,075 |
| 13 | 205,528 | 217,085 | 247,398 | 297,574 | 365,385 | 447,965 | 543,744 | 611,896 | 597,697 | 513,479 | 415,402 |
| 14 | 185,617 | 191,260 | 202,296 | 211,785 | 239,593 | 280,371 | 343,472 | 384,113 | 386,639 | 340,309 | 285,980 |
| 15 | 22,846 | 29,673 | 35,202 | 36,818 | 73,181 | 125,474 | 159,175 | 133,984 | 88,814 | 52,087 | 37,137 |

IMAGE-1 | IMAGE-2 | IMAGE-3 | IMAGE-4 | IMAGE-5 | IMAGE-6 | IMAGE-7 | IMAGE-8 | IMAGE-9 | IMAGE-10 | IMAGE-11

WINDOW

FIG. 14

AUTOFOCUS

BACKGROUND

This disclosure relates generally to the field of digital image capture operations. More particularly, this disclosure relates to techniques for improved autofocus operations in a digital camera. A camera's autofocus system automatically adjusts the camera lens' position to obtain focus on a subject. As used in this disclosure, the term "camera" refers to any device having digital image capture capability. Examples include, but are not limited to, digital SLR cameras, point-and-shoot digital cameras, mobile phones, laptop or notebook computer systems, tablet computer systems, personal digital assistants, and portable music/video players.

Autofocus systems may generally be divided into two types: active, and passive. Active autofocus systems measure the distance to a subject by emitting, and using, a signal to estimate the distance to the subject (e.g., ultrasound and infrared). The estimated distance is then used to adjust or set the camera's focal length (i.e. lens position). In contrast, passive autofocus systems set a camera's focal length or lens position by analyzing an image captured by the camera's optical system. Passive autofocusing can be achieved through phase detection or contrast measurement.

Many small multifunction devices such as mobile phones use a passive autofocus technique based on contrast measurement. In devices such as these, autofocus operations involve adjusting the position of the device's lens at a specified number of locations and evaluating the focus (e.g., contrast) between corresponding areas in successive images. That lens position corresponding to the maximum contrast, as determined by the number of sharp edges detected, is assumed to correspond to maximum sharpness and best focus.

Figure 1:
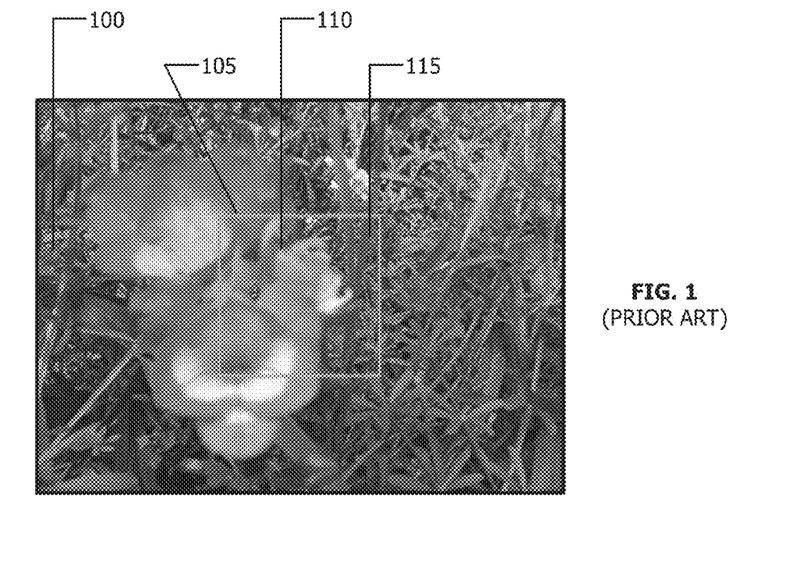
FIG. 1 shows an image that illustrates the problem of background focusing.

One problem many autofocus systems suffer from is that they may often focus on the background (rather than the subject). When this happens, the autofocus system sets the focal length so that the background is in focus while the intended subject is out of focus. The problem of background focusing is illustrated by FIG. 1 in which image 100's autofocus region 105 includes flower (subject) 110 and grass (background) 115. Inspection of image 100 shows background grass 115 is in focus while flower 110 is out of focus. This is because, within autofocus area 105, grass 115 contains many more sharp edges than does flower 110. Because of this, the autofocus system judges the lens position needed to bring the background grass into focus as proper.

SUMMARY

A first disclosed embodiment provides a method to determine an autofocus lens position. As used herein, the phrase "autofocus lens position" refers to the lens position determined by a camera's autofocus system as proper. The method includes capturing a first image of a scene using a first lens position, obtaining a plurality of focus scores for the image (where each focus score corresponds to a unique area of the image), repeating the acts of capturing and obtaining until a first burst of images are obtained (where each image is captured at a different lens position and each unique area is common to all of the images). Once the burst (or a portion thereof) has been captured the method continues by aggregating each of the focus scores corresponding to a common unique area and a different lens position to obtain focus score groups. One area-specific focus score may then be identified from each focus score group. The resulting set of area-specific focus scores (each having a corresponding lens position) may then be reviewed to identify a "best" lens position based on a selection criteria. In one embodiment, the act of reviewing may be aided by first sorting the set of area-specific focus scores in accordance with their corresponding lens positions. In another embodiment, a similar result may be obtained using a histogram.

In one embodiment, different selection thresholds may be applied to the area-specific focus scores. Different thresholds may be used to introduce bias toward either a macro or infinity lens position. In another embodiment, windows corresponding to low-contrast regions of the image may be identified and thereafter ignored during autofocus lens position determination operations. In yet another embodiment, focus score trends may be used to identify when autofocus scan processing may be prematurely terminated. By way of example, when a sufficient number of focus scores decrease in value over a specified time (number of images), autofocus scan operations may be safely terminated. In still another embodiment, once an autofocus operation has set the lens position, subsequently captured images may be used to determine when another autofocus operation is needed. In another embodiment, motion information may be used to abort an in-progress autofocus operation and/or retrigger a new autofocus operation.

A computer executable program to implement the above methods may be stored in any media that is readable and executable by a computer system. In addition, program code to implement any one or more of the above methods may be incorporated into an electronic device having digital image capture capability.

DETAILED DESCRIPTION

This disclosure pertains to systems, methods, and computer readable media to provide improved autofocus operations. In general, techniques are disclosed that show how to improve contrast-based autofocus operations by applying a novel threshold-and-select action to window-specific focus scores. More particularly, techniques disclosed herein evaluate a multi-window autofocus area over a burst collected group of images. For each captured image, focus scores for each window within an autofocus area may be collected, aggregated and then consolidated to identify a single focus metric and its associated lens position for each window. The window-specific focus scores may be reviewed and selection of a "best" autofocus lens position made using a selection criteria. The specified criteria may be used to bias the selection to either a front-of-plane (macro) or back-of-plane (infinity) focus position.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of image capture systems having the benefit of this disclosure.

Figure 2A:
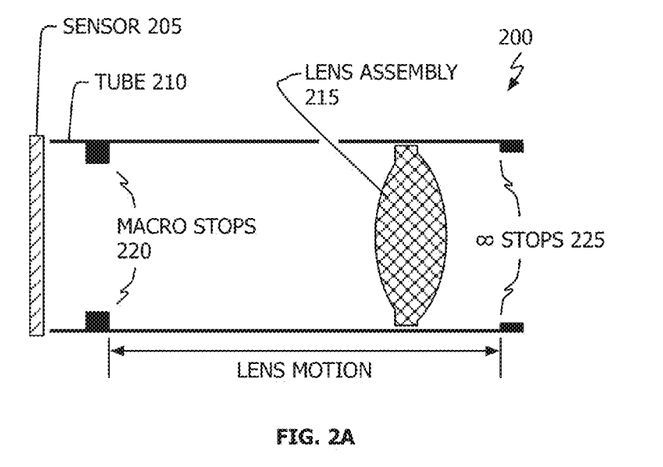
FIGS. 2A-2C show an illustrative image capture assembly in accordance with one embodiment.
Figure 2B:
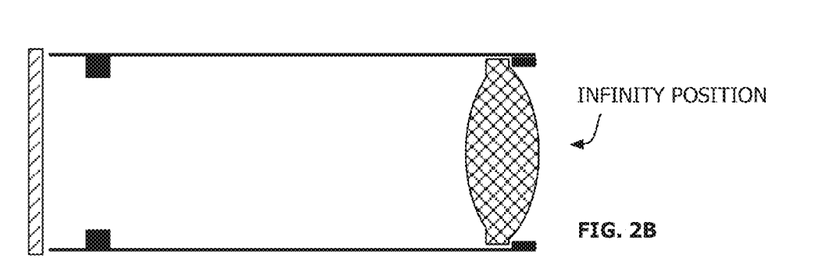
Figure 2C:
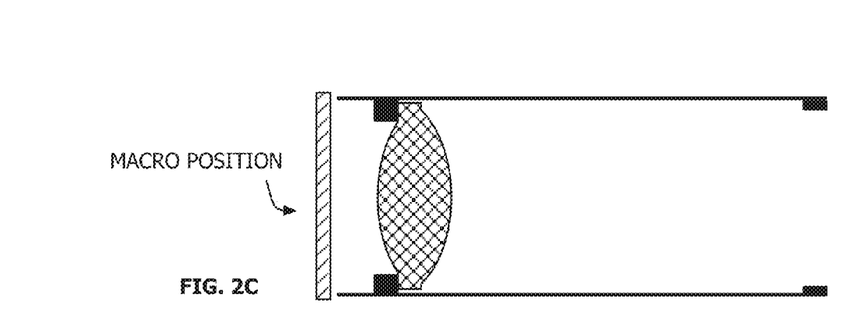

Before introducing a first embodiment, it may be useful to review a typical camera's structure vis à vis lens movement. Referring to FIG. 2A, capture assembly 200 can include image sensor 205, lens tube 210, lens assembly 215, macro stops 220, and infinity (∞) stops 225. In this disclosure, the terms "lens" and "lens assembly" are taken to be synonymous. As such, the term lens can mean a single optical element or multiple elements configured into a stack or other arrangement. Referring to FIG. 2B, when lens 215 is against macro stops 220 imaging assembly 200 may focus on objects as close as a first distance (hereinafter referred to as the "macro distance"). Referring to FIG. 2C, when lens 215 is against infinity stops 225 all objects beyond a second distance will be in focus (hereinafter referred to as the "infinity distance"). During autofocus operations, lens 215 may be moved from one end of tube 210 to the other, stopping to capture an image at a specified number of locations along the way. The locations at which lens 215 stops may be uniformly or non-uniformly distributed between the two sets of stops (macro 220 and infinity 225). One of ordinary skill in the art will recognize that a particular camera's macro and infinity distances, as well as the number of lens positions used during autofocus operations, can depend on the camera's specific design. By way of example, some modern mobile telephones have a macro distance of 10-40 centimeters, an infinity distance of 1.5-3 meters, and can take between 9 and 15 images—each at a different lens position—during autofocus operations.

Figure 3:
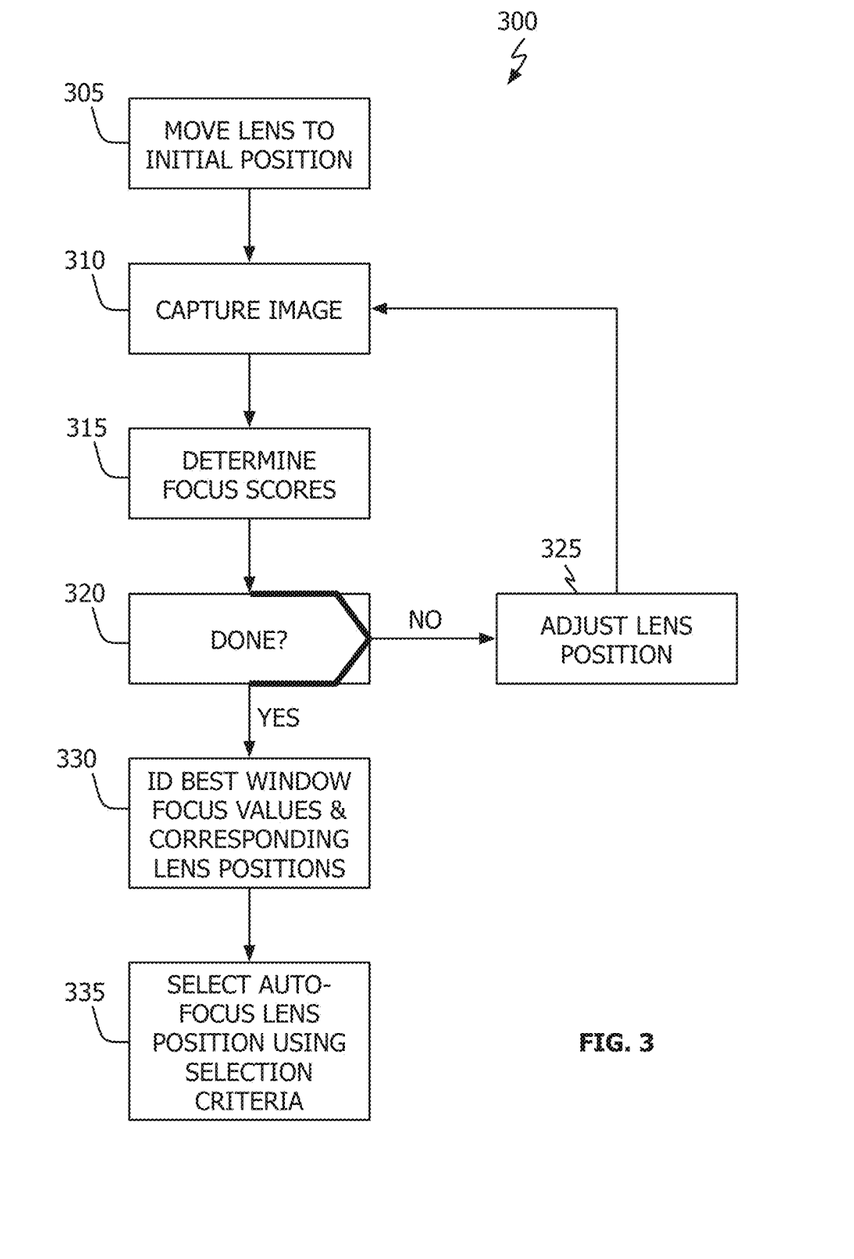
FIG. 3 shows, in block diagram form, an autofocus operation in accordance with one embodiment.

Referring to FIG. 3, autofocus operation 300 in accordance with one embodiment can begin by moving a camera's lens to an initial or start position (block 305). Example start positions include the camera's macro and infinity distance positions (see FIGS. 2B and 2C). Once positioned, a first image may be captured (block 310), after which focus scores for the image may be determined (block 315). One approach to the generation of focus scores is to use dedicated hardware whose operating parameters may be set via software and/or firmware. Such hardware may be part of, or intimately coupled to, a camera's image processing pipeline hardware. In contrast-based autofocus systems, focus scores may be indicative of the number of hard edges identified in a specified area of an image.

Figure 4A:
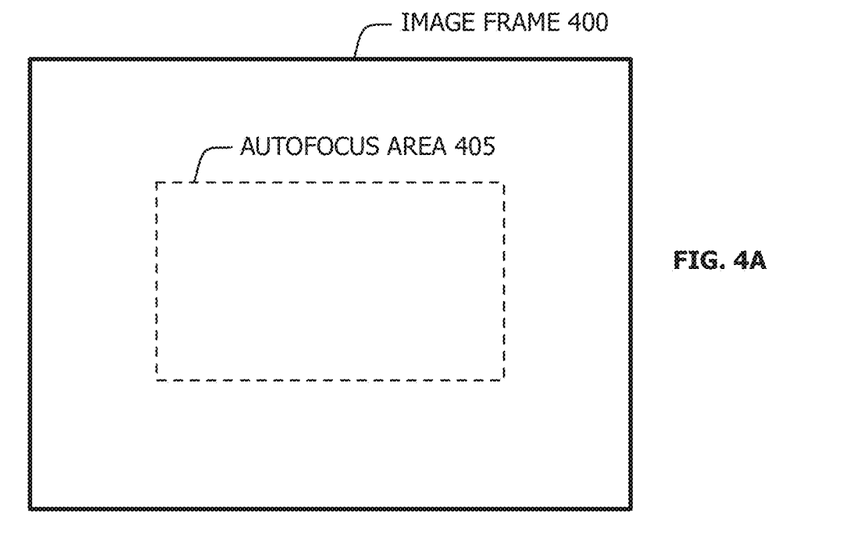
FIGS. 4A and 4B illustrate autofocus areas in accordance with different embodiments.
Figure 4B:
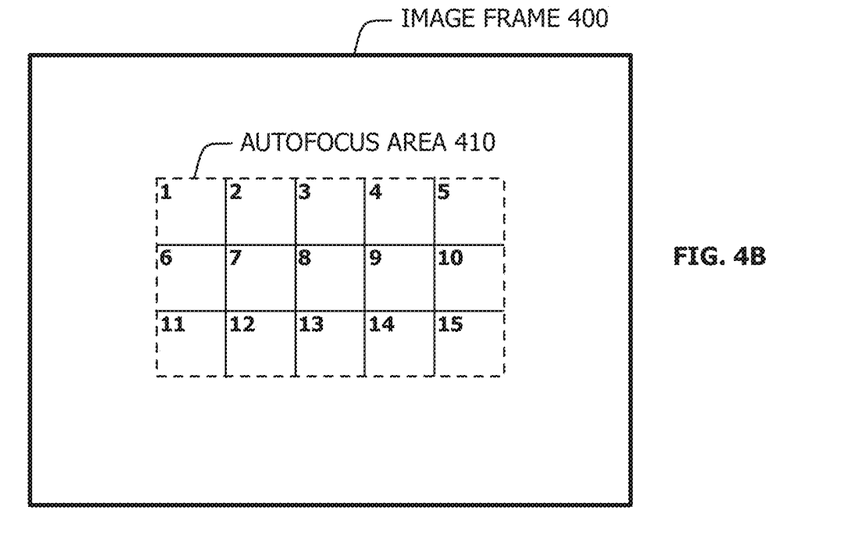

Referring to FIG. 4A and in accordance with autofocus operation 300, capture frame 400 (representing image data captured by sensor 205) has within it autofocus area 405. In general, only image data within autofocus area 405 is considered during autofocus operation 300. In one embodiment, autofocus area 405 may be coincident with capture frame 400. In another embodiment, autofocus area 405 may be centered in frame 400 as shown. In still another embodiment, the location and/or size of autofocus area 405 may be moved under user and/or program control. An example of the former can occur when a user touches a camera's touch screen control interface. An example of the latter may occur when a user takes a picture in which the subject is aligned against one side of the frame (e.g., far left or far right) and the rest of the frame is a smooth, uniformly colored, surface. In this situation, control software may move autofocus area 405 to coincide with the subject. In general, embodiments in accordance with autofocus operation 300 partition autofocus area 405 into multiple smaller regions (hereinafter referred to as windows). For example, autofocus area 405 may be partitioned into a W×H grid of windows. Referring to FIG. 4B, autofocus area 410 is shown partitioned into a (5×3) grid of windows. The number of windows into which autofocus area 405 may be partitioned may be dependent, at least in part, on the specialized focus metric components used and/or the amount of available memory.

Figure 5:
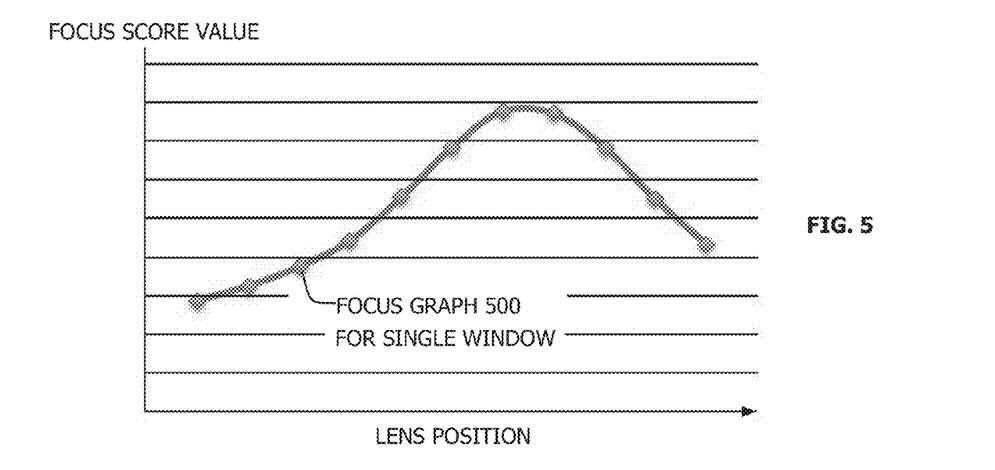
FIG. 5 shows a focus graph in accordance with one embodiment.

Returning to FIG. 3, after an image is captured (block 310) and it's focus scores obtained (block 315), a test may be made to determine if all of the desired or needed images have been acquired (block 320). One illustrative autofocus system may be designed (or programmed) to capture one image at each of nine (9) lens' positions while another may be designed (or programmed) to capture one image at each of thirteen (13) lens' positions. If at least one image remains to be captured (the "NO" prong of block 320), the position of lens 215 may be adjusted (block 325), whereafter autofocus operation 300 continues at block 310. Actions in accordance with blocks 305-325 may be known or referred to as the "scan phase" on autofocus operation 300. If all needed images have been captured (the "YES" prong of block 320), the best focus score for each window, and their corresponding lens positions, may be identified (block 330). If M represents the number of images captured, and N represents the number of windows in the autofocus area (e.g., autofocus area 405), actions in accordance with blocks 310-325 generate (M×N) focus scores; M focus scores for each of the N windows in the autofocus area. If each of the M focus scores for a single window are plotted against the lens position at which each were determined, the resulting plot is referred to as a focus graph. See FIG. 5. In one embodiment, the peak of the focus graph indicates the best focus distance for that window (e.g., focus graph 500). When each of the N groups of M focus scores are evaluated in this way, each window's best focus score—and its corresponding lens position—may be determined (block 330).

The lens positions corresponding to the collection of M focus scores determined in accordance with block 330 can be reviewed and, using a selection criteria, the best autofocus lens position chosen (block 335). In one embodiment, the collection of lens positions may be sorted or arranged to facilitate the identification of lens positions at a specified percentile (or equivalent measure) from either the camera's macro position or infinity position. For example, if the selection criteria is the "33rd percentile from the macro position," the autofocus lens position may be set to a distance corresponding to that lens position that is ⅓ the way between the macro distance and the infinity distance in the list of lens positions corresponding to the N focus scores. The same setting would result if the selection criteria were 67th percentile from the infinity position." (See discussion below regarding FIG. 9.)

Figure 6:
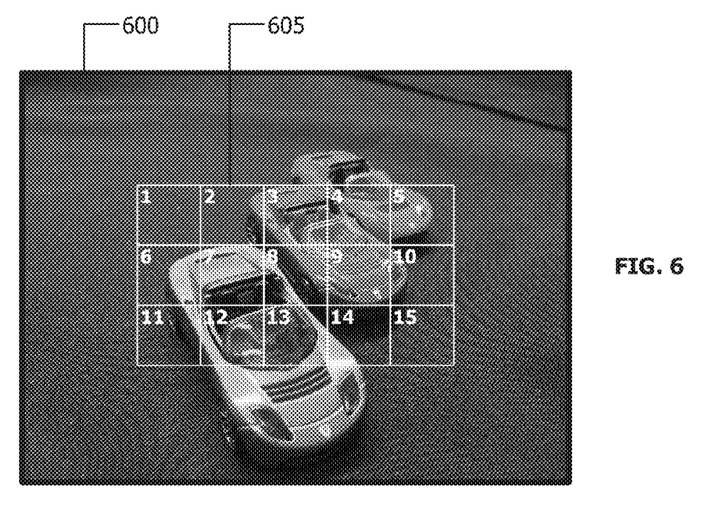
FIG. 6 shows an image and example autofocus area in accordance with one embodiment.

Referring to FIG. 6 and by way of example, consider image 600 of three (3) toy cars on a dark, low-texture background. In the illustrated embodiment, autofocus area 605 is centered in the image's frame and is partitioned into 15 windows. If autofocus operation 300 captures eleven (11) copies of image 600 (each at a different lens position), there will be a total of 165 focus scores: 11 values for each of the 15 windows. Sample data illustrating this setup may be seen in FIG. 7. As shown there, lens position 31 corresponds to the camera's infinity setting, and lens position 218 corresponds to the camera's macro setting. The largest values in each window over all eleven (11) images are indicated with bold borders. Each of these values is associated with a peak in the window's focus graph. To illustrate this, consider FIG. 8 which shows the focus graphs for windows 1 and 7. One aspect of note is that the focus scores for window 1 are significantly less than those for window 7. Referring to FIG. 6, it can be seen that image data in window 1 has very few sharp edges (and therefore low focus scores) while image data in window 7 includes many sharp edges (and therefore higher focus scores).

Figure 7:
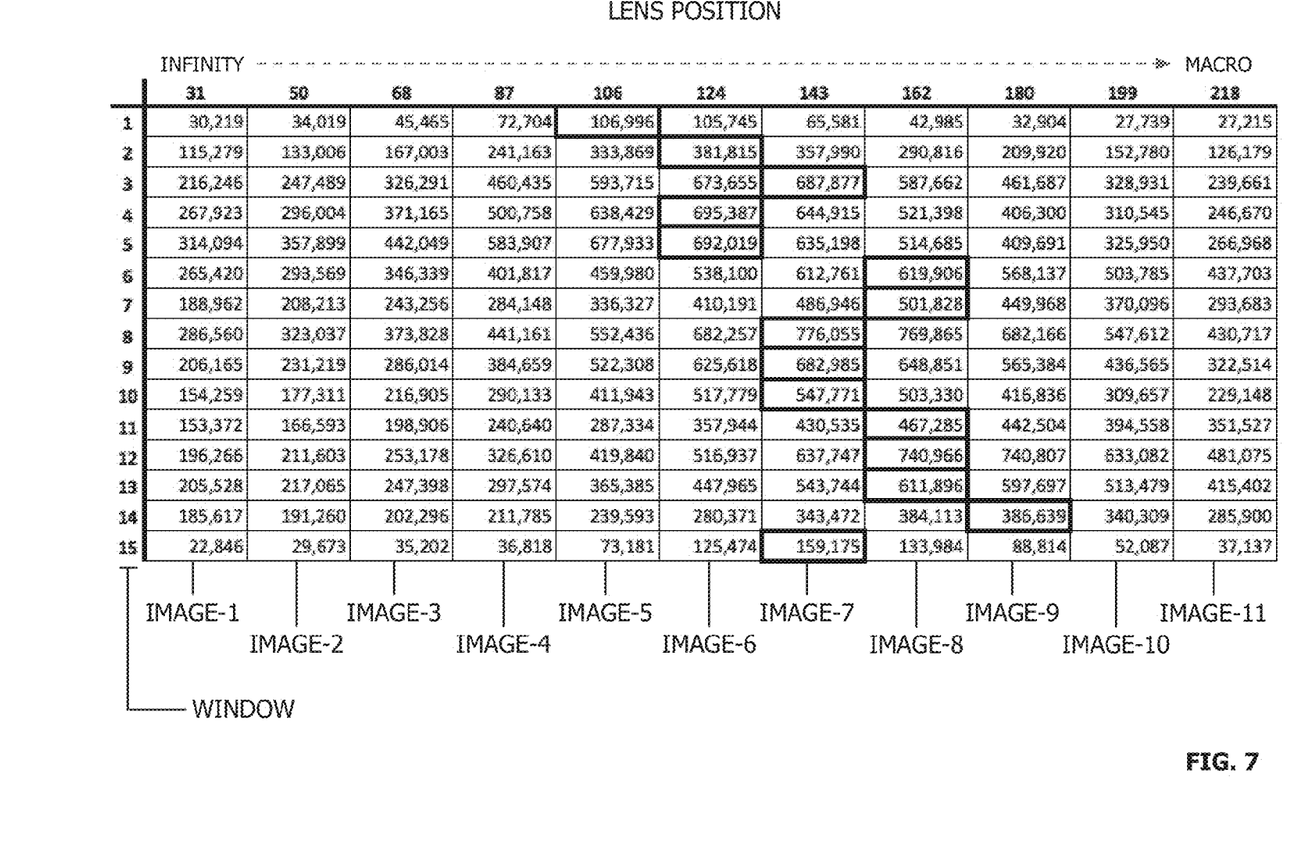
FIG. 7 presents sample autofocus data in accordance with one embodiment.
Figure 8:
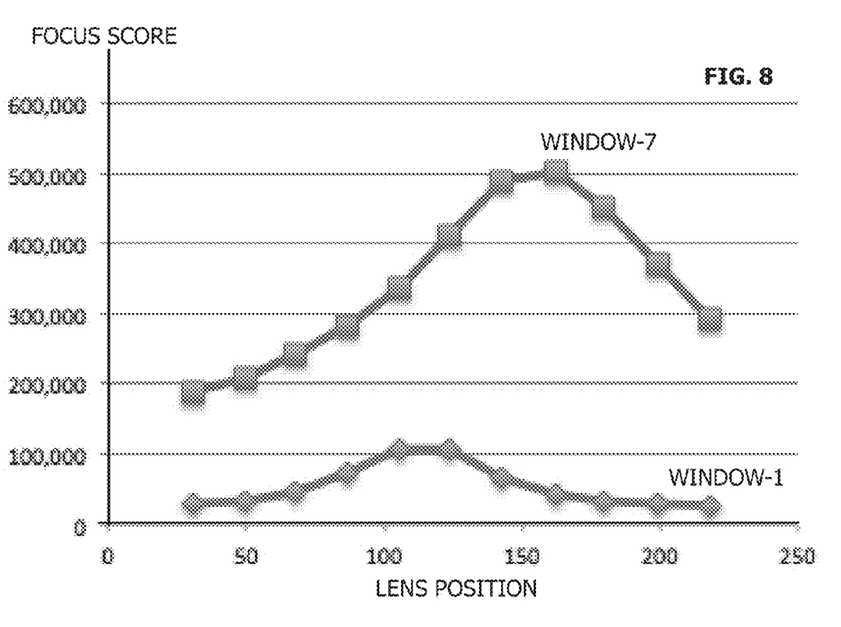
FIG. 8 shows a comparison between two focus graphs generated from the data in FIG. 7.
Figure 9:
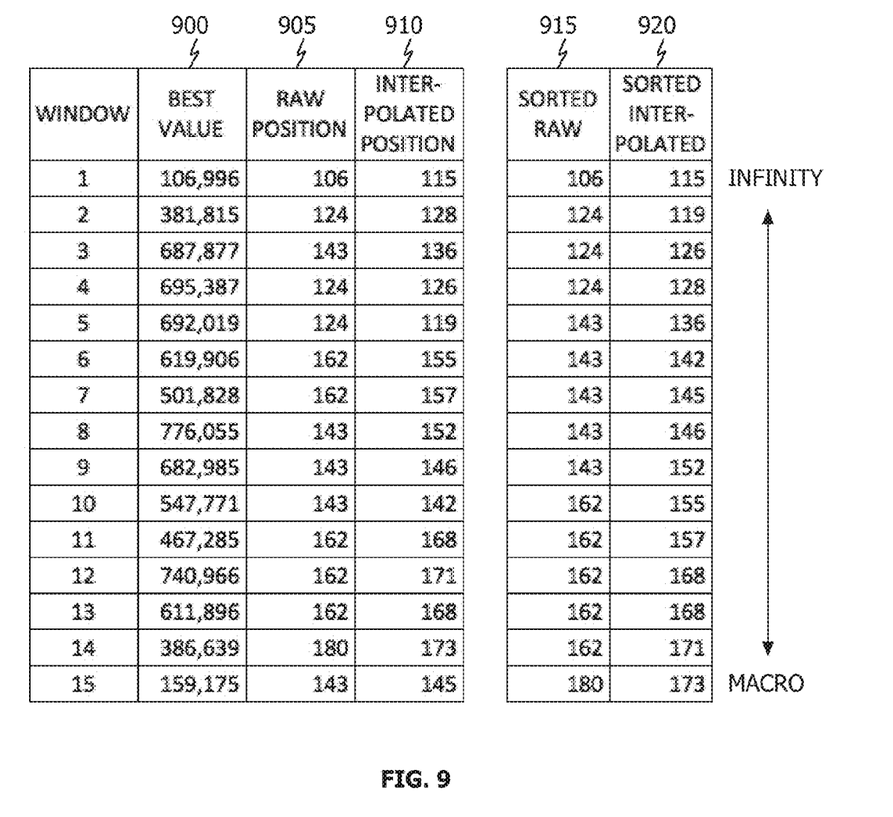
FIG. 9 shows, in table form, autofocus lens position data in accordance with one embodiment.

In one embodiment, the largest focus score for each window may be selected and their corresponding lens positions sorted (block 330). In another embodiment, an interpolation may be made between the largest focus score for each window and one or more of its immediate neighbors (e.g., a cubic or bi-cubic interpolation) and their corresponding lens positions sorted (block 330). Referring to FIG. 9, there is shown the largest focus score for each window as shown in FIG. 7 (best value 900), the best value's corresponding lens position as shown in FIG. 7 (raw position 905), and the best value's corresponding lens position applying a cubic interpolation (interpolated position 910). Column 915 shows raw position data 905 arranged in ascending order and column 920 shows interpolated position data 910 arranged in ascending order. In one embodiment, sorted list 915 may be provided by acts in accordance with block 330 or 335 in FIG. 3.

A final autofocus lens position may be selected from the identified lens positions in accordance with a specified threshold. For example, referring again to FIG. 9, if the specified threshold is ⅓ from macro (or, equivalently, ⅔ from infinity), that lens position that is 5th (⅓ of 15) in the sorted list from the macro starting position is the selected autofocus lens position: 162 if using sorted list 915 and 157 if using sorted list 920. In small camera form factors, it has been found beneficial to bias selection of the autofocus lens position toward a closer focus. In another embodiment, if the specified threshold is ⅗ from infinity, that lens position that is 9th (⅗ of 15) in the sorted list from the infinity starting position is the selected autofocus lens position: 143 if using sorted list 915 and 152 if using sorted list 920.

Figure 10:
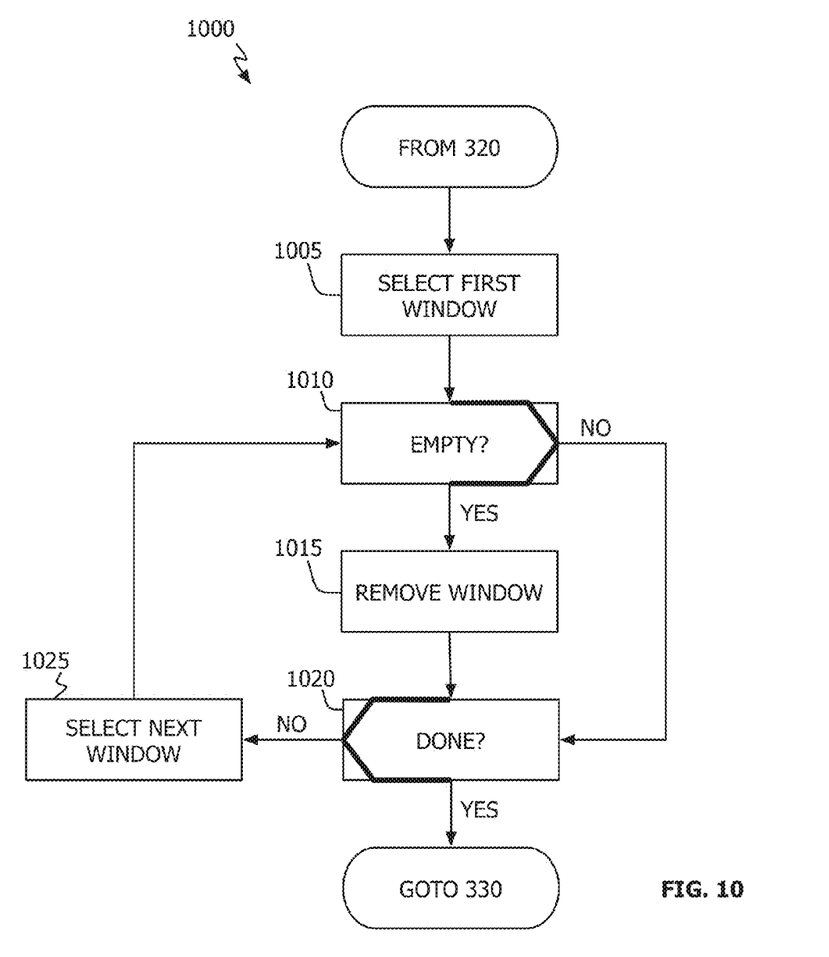
FIG. 10 shows, in flowchart form, an empty windows operation in accordance with one embodiment.

In one embodiment, autofocus operation 300 may be enhanced to account for empty windows. As used here, the phrase "empty window" refers to any window whose focus scores are indicative of an area with less than a specified amount of contrast. By identifying and ignoring these windows, autofocus operations in accordance with this disclosure may operate more efficiently and consume less computational resources (e.g., processor time and/or memory). Referring to FIG. 10, empty-window operation 1000 begins by selecting a first window's focus scores (block 1005). Recall, at the point block 320 is left via it's "YES" prong, each window in the camera's autofocus area has one focus score for each captured image. A test may then be made to determine if the window is empty (block 1010). In one embodiment, a window may be considered empty when the difference between it's largest and smallest focus scores is less then a specified level (e.g., 15% or 20%). In other embodiments this value may be anywhere between 1% and 99%—depending on the goal for which the image capture device is designed. It should also be noted that different windows may be assigned different "threshold" values; values for which a window may be considered empty. If the window is determined to be empty (the "YES" prong of block 1010), the window may be removed or marked in a manner that it's data may be ignored in later steps (block 1015). Another test may then be made to determine if all windows have been evaluated (block 1020). If they have (the "YES" prong of block 1020), autofocus operations in accordance with this disclosure may continue at block 330 (see FIG. 3). If the window is found not to be empty (the "NO" prong of block 1010), operation 1000 continues at block 1020. If additional windows remain to be evaluated (the "NO" prong of block 1020), the next window can be selected (block 1025), whereafter operation 1000 continues at block 1010.

Figure 11:
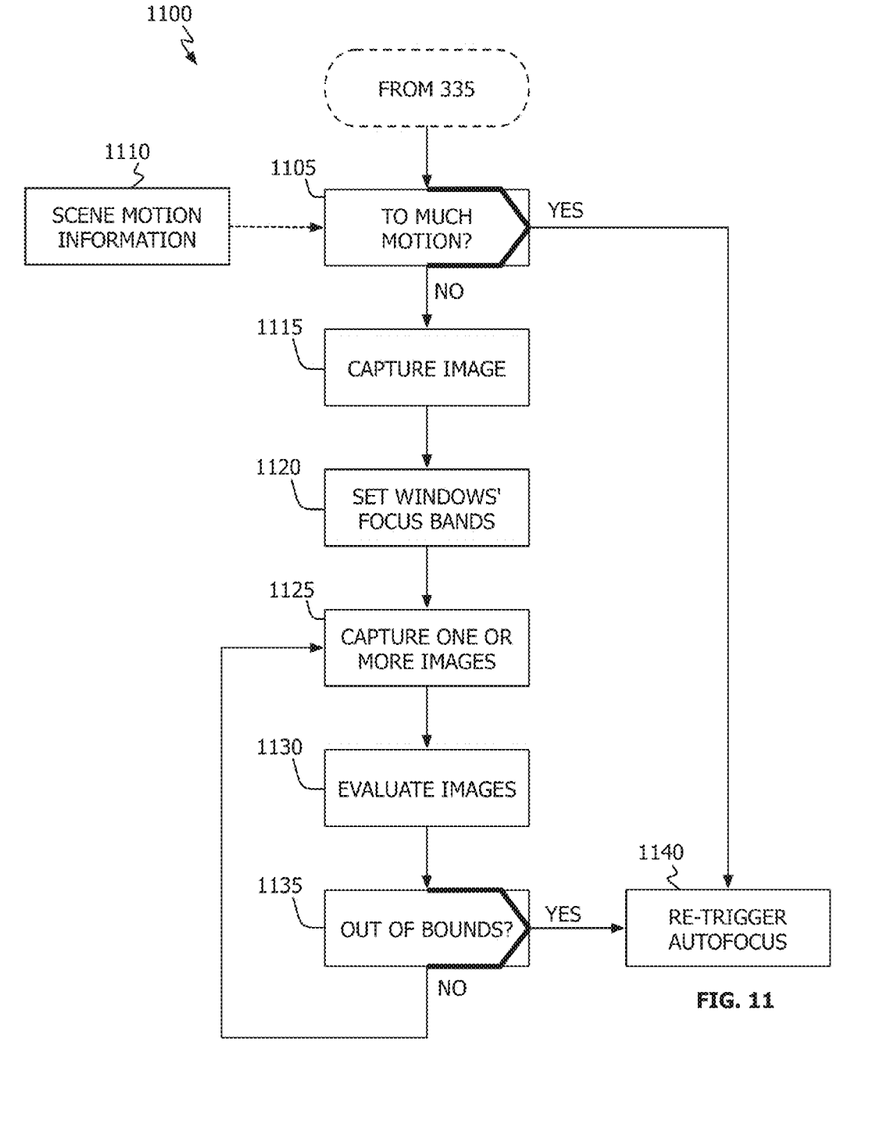
FIG. 11 shows, in flowchart form, an autofocus retrigger operation in accordance with one embodiment.

In another embodiment, autofocus functions in accordance with this disclosure may be extended to incorporate retrigger operations. Once a camera's lens position has been set in accordance with autofocus operation 300, the camera may continue to capture and evaluate images to determine if another autofocus operation should be initiated—and the lens position changed. Referring to FIG. 11, autofocus retrigger operation 1100 may begin after a camera's lens position has been set by a prior autofocus operation. An initial check may be made to determine if the camera has been subject to excessive motion (block 1105). In one embodiment, motion information 1110 may be provided by one or more sensors affixed to, or contained in, the camera. Illustrative sensors include accelerometers and gyroscopes. What constitutes an excessive amount of motion can be set by the designer and may depend upon many factors including the camera's current operational setting. For example, higher shutter speeds are generally less tolerant of motion than are lower shutter speeds. If excessive motion has not been detected (the "NO" prong of block 1105), an image may be captured (block 1115) and its focus scores (focus graph) used to set each window's focus band (block 1120). In another embodiment, the focus scores obtained during autofocus operation's scan phase.

Figure 12:
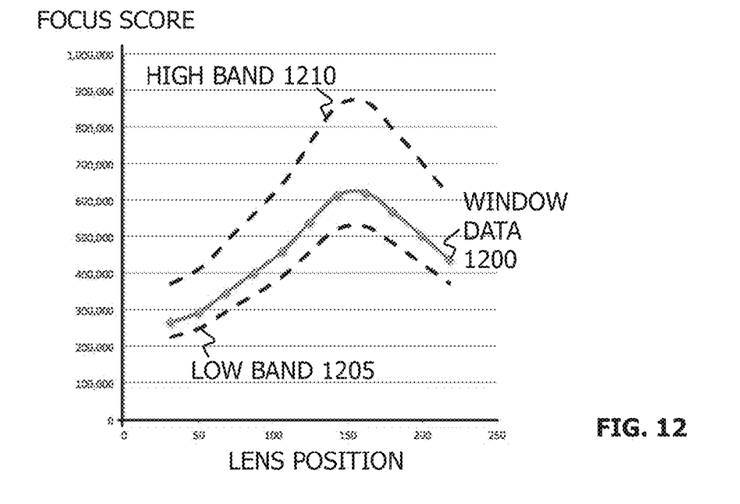
FIG. 12 shows focus bands about a window's focus graph in accordance with one embodiment.

Referring to FIG. 12, focus graph 1200 represents a single window's focus scores. Low-band 1205 and high-band 1210 may be set for monitoring purposes as discussed below. As shown, a window's focus bands do not need to be set symmetrically about its focus graph (although they may be). The spread between data 1200 and low-band 1205, and between data 1200 and high-band 1210 may be set by the designer to achieve specific operational goals. In practice, low-band values between 0.5 to 0.95 of the corresponding window's focus scores and high-band values between 1.1 to 1.5 of the corresponding window's focus scores have been found useful. Once a camera is focused on a subject, focus scores tend to decrease regardless of whether the camera is moved closer to, or farther from, the subject. In contrast, focus metric scores generally move higher only when the scene changes (e.g., when the number of sharp edges in the image increases). In part, this is one reason it may be beneficial to use asymmetric focus bands as shown in FIG. 12.

Returning to FIG. 11, once each window's focus bands have been established, one or more images may be captured (block 1125) and the resulting focus scores evaluated (block 1130). If an out-of-bounds condition is found not to exist (the "NO" prong of block 1135), retrigger operation 1100 continues at block 1125. In one embodiment, more than a threshold number of windows must be found to be out-of-bounds at the same time before an out-of-bounds condition may be declared. In another embodiment, more than a threshold number of windows must be found to be out-of-bounds at the same time and for at least a minimum number of consecutive images before an out-of-bounds condition may be declared. For example, if more than half the windows are outside their respective bounds for 7 consecutive frames, an out-of-bounds condition may be declared. In another example embodiment, if at least two-thirds of the windows are outside their respective bounds for 5 consecutive frames, an out-of-bounds condition may be declared. In still another embodiment, out-of-bounds conditions for normal light surroundings may be different from those used in low-light surroundings. More generally, different bounds may be used for different situations (e.g., low light, bright light, sports capture mode, portrait capture mode). If either excessive motion is detected (the "YES" prong of block 1105) or an out-of-bounds condition is detected (the "YES" prong of block 1135), a new autofocus operation may be triggered (block 1140). In one embodiment, retrigger operation 1100 may ignore windows determined to be empty in accordance with FIG. 10.

Figure 13:
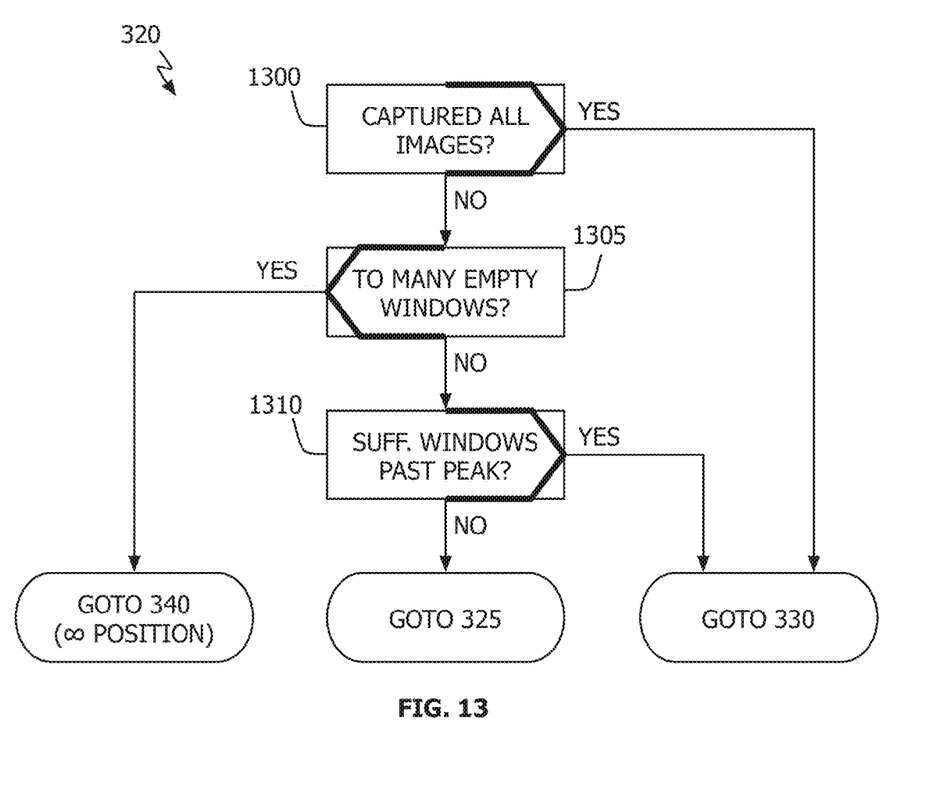
FIG. 13 shows, in flowchart form, an autofocus early-out or abort operation in accordance with one embodiment.

In yet another embodiment, autofocus operation 300 may be enhanced to identify certain conditions which may allow an autofocus lens position to be set without capturing a full complement of images in accordance with operation 300's scan phase (see FIG. 3). As shown in FIG. 13, these early-out capabilities may be implemented as part of block 320. As discussed above, a first test may be made to determine if all of the target images have been captured (block 1300). If they have (the "YES" prong of block 1300), control passes to block 330. If additional images in a burst remain to be captured (the "NO" prong of block 1300), a second test may be made to determine if more than a specified number of empty windows have been detected (block 1305). In one embodiment, if ⅔ or more of the autofocus area's windows are determined to be empty (see discussion above), the camera may be presumed to be pointing at the sky or a uniformly texture-less surface (a default autofocus lens position in these cases may be the camera's infinity position). In another embodiment, at least ½ of the autofocus area's windows must indicate empty for at least 3 consecutive images. In other embodiments, these values may be changed to meet whatever constraints the camera's target environment may present. In general, if more than some specified number of windows present empty, there is little to be gained in continuing the autofocus operation. In summary, if "too many" windows are determined to be empty (the "YES" prong of block 1305), operations may continue at block 335 where the lens may be set to the infinity position. If an insufficient number of windows are determined to be empty (the "NO" prong of block 1305), another test may be made to determine if a sufficient number of windows' corresponding auto focus graphs are on a downward trend (block 1310). If this condition exists, all the data needed to determine a best autofocus lens position has been collected and any further time spent collecting and processing data would be a waste of resources. If this condition is found (the "YES" prong of block 1310), operations may continue at block 330. In one embodiment, if a sufficient number of windows are simultaneously past their peak value for at least X consecutive images, the scan phase of autofocus operation 300 may be terminated (i.e. aborted). Illustrative values for X are 1 to 5 for an autofocus area having 15 windows and a frame capture rate of between 20 and 30 frames-per-second. In another embodiment, if a sufficient number of windows are simultaneously past their peak value by at least a specified amount, the scan phase of autofocus operation 300 may be terminated. The specified amount constitutes a tuning parameter and may be set to provide rational operations. In an embodiment using an autofocus area having 15 windows and a frame capture rate of between 20 and 30 frames-per-second, at least 7 windows must simultaneously be down from their peak value by at least 12%. Finally, if there are not a sufficient number of windows past their peak (the "NO" prong of block 1310), operations continue at block 325.

Figure 14:
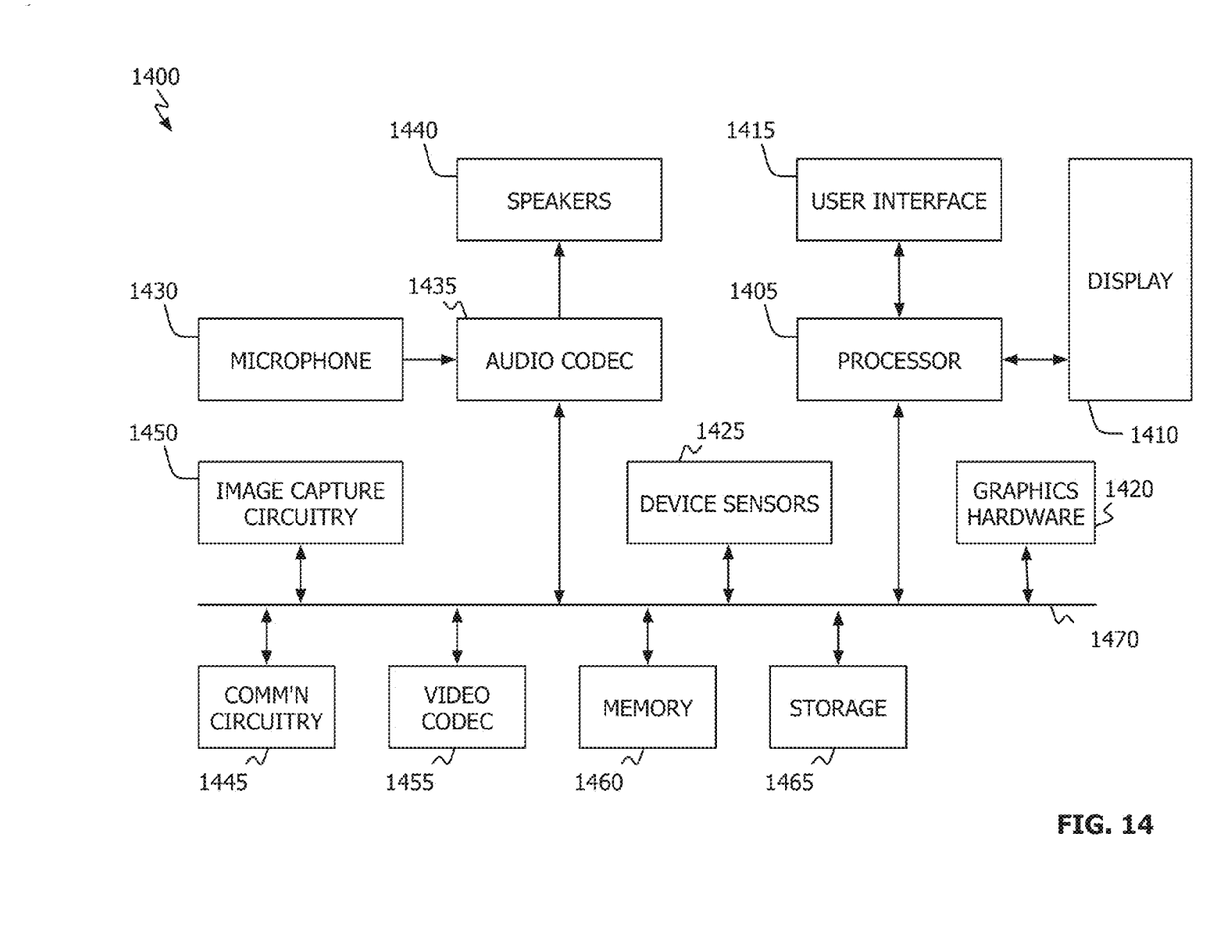
FIG. 14 shows, in block diagram form, a multi-function electronic device in accordance with one embodiment.

Referring to FIG. 14, a simplified functional block diagram of illustrative electronic device 1400 is shown according to one embodiment. Electronic device 1400 could be, for example, a mobile telephone, personal media device, portable camera, or a tablet, notebook or desktop computer system. As shown, electronic device 1400 may include processor 1405, display 1410, user interface 1415, graphics hardware 1420, device sensors 1425 (e.g., proximity sensor/ambient light sensor, accelerometer and/or gyroscope), microphone 1430, audio codec(s) 1435, speaker(s) 1440, communications circuitry 1445, image capture circuit or unit 1450, video codec(s) 1455, memory 1460, storage 1465, and communications bus 1470.

Processor 1405 may execute instructions necessary to carry out or control the operation of many functions performed by device 1400 (e.g., such as autofocus operations in accordance with this disclosure). Processor 1405 may, for instance, drive display 1410 and receive user input from user interface 1415. User interface 1415 can take a variety of forms, such as a button, keypad, dial, a click wheel, keyboard, display screen and/or a touch screen. User interface 1415 could, for example, be the conduit through which a user initiates image capture. Processor 1405 may be a system-on-chip such as those found in mobile devices and include one or more dedicated graphics processing units (GPUs). Processor 1405 may be based on reduced instruction-set computer (RISC) or complex instruction-set computer (CISC) architectures or any other suitable architecture and may include one or more processing cores. Graphics hardware 1420 may be special purpose computational hardware for processing graphics and/or assisting processor 1405 perform computational tasks. In one embodiment, graphics hardware 1420 may include one or more programmable graphics processing units (GPUs).

Image capture circuitry 1450 may capture still and video images that may be processed to generate images and may, in accordance with this disclosure, include the necessary hardware (and firmware) to generate focus scores for one or more areas in an image. Output from image capture circuitry 1450 may be processed, at least in part, by video codec(s) 1455 and/or processor 1405 and/or graphics hardware 1420, and/or a dedicated image processing unit incorporated within circuitry 1450. Images so captured may be stored in memory 1460 and/or storage 1465. Memory 1460 may include one or more different types of media used by processor 1405, graphics hardware 1420, and image capture circuitry 1450 to perform device functions. For example, memory 1460 may include memory cache, read-only memory (ROM), and/or random access memory (RAM). Storage 1465 may store media (e.g., audio, image and video files), computer program instructions or software, preference information, device profile information, and any other suitable data. Storage 1465 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1460 and storage 1465 may be used to retain computer program instructions or code organized into one or more modules and written in any desired computer programming language. When executed by, for example, processor 1405 such computer program code may implement one or more of the methods described herein.

It is to be understood that the above description is intended to be illustrative, and not restrictive. The material has been presented to enable any person skilled in the art to make and use the inventive concepts as claimed and is provided in the context of particular embodiments, variations of which will be readily apparent to those skilled in the art (e.g., some of the disclosed embodiments may be used in combination with each other). A number of the disclosed parameters may be generally classified as "tuning" parameters and, as such, may be used to customize and optimize a particular implementation to meet its intended function. By way of example, parameters that may be varied depending upon the implementation include the threshold employed to bias lens position selection, the number of images per burst, the size of the autofocus area, the number and placement of lens positions at which images are captured during an autofocus operation, the interpolation method used to identify the peak value of a window's focus graph, whether interpolation is used, what difference between a window's minimum and maximum focus scores indicates an "empty" window, how much motion constitutes an excessive amount of motion, the size and spacing of focus bands and whether focus bands are used, and how many consecutive windows must be identified as having focus scores past their peak and to what extent before early termination of an autofocus' scan operations may be terminated. Other parameters may be more closely tied to the underlying camera hardware. Example of this latter type include the maximum number of windows the autofocus area may be divided into. The scope of the inventive concept therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device comprising instructions stored thereon to cause one or more processors to:
   capture an image of a scene at a lens position;
   obtain a focus score for each of N number of unique areas within the image;
   repeat the instructions to capture and obtain until M number of images are obtained, wherein—
      each image of the M number of images is captured at a different lens position, and
      each of the N unique areas in one of the M number of images has a corresponding unique area in each of the other M number of images;
   aggregate each of the corresponding M focus scores for each of the N unique areas to obtain N focus score groups;
   identify, for each focus score group, a maximum focus score and one or more additional focus scores;
   interpolate, for each focus score group, between the maximum focus score and the one or more additional focus scores;
   determine, for each focus score group, a peak value based on the interpolation;
   select, for each focus score group, the peak value to obtain an area-specific focus score; and
   select a lens position based on the respective area-specific focus score of a first one of the focus score groups.

2. The non-transitory program storage device of claim 1, wherein the instructions to cause the one or more processors to select the lens position comprise instructions to cause the one or more processors to select in accordance with a first specified threshold that is biased toward a macro lens position.

3. The non-transitory program storage device of claim 1, wherein the instructions to cause the one or more processors to aggregate comprise instructions to cause the one or more processors to:
   aggregate each of the focus scores corresponding to a common area and the different lens position to obtain temporary focus score groups;
   determine, for each temporary focus score group, a minimum focus score and a maximum focus score; and
   remove, from each temporary metric value group, all focus scores when a difference between the group's minimum focus score and maximum focus score is less than a second specified threshold to obtain the focus score groups.

4. The non-transitory program storage device of claim 3, wherein the second specified threshold comprises a value between 1% and 50%.

5. The non-transitory program storage device of claim 3, wherein after the instructions to cause the one or more processors to select are performed, the instructions to cause the one or more processors to identify further comprise instructions to cause the one or more processors to:
   identify, for each area-specific focus score, a corresponding upper-bound and lower-bound value; and
   execute the instructions to cause the one or more processors to capture, obtain, repeat, aggregate, identity, determine, and select, when a first specified number of the area-specific focus scores are determined to be greater than their corresponding upper-bound or less than their corresponding lower-bound at least a second specified number of times.

6. The non-transitory program storage device of claim 1, wherein the instructions to cause the one or more processors to repeat comprise instructions to cause the one or more processors to:
monitor, for each image, a value trend for each of the focus scores associated with each unique area of the image; and
abort image capture when the value trend associated with at least a first specified number of unique areas indicates a downward trend for at least a second specified number of consecutive images.

7. The non-transitory program storage device of claim 6, wherein:
the first specified number comprises a number between 15% and 80%; and
the second specified number comprises a number between 5% and 50%.

8. An autofocus method for a digital image capture device, comprising: capturing an image of a scene at a lens position;
obtaining a focus score for each of N number of unique areas within the image;
repeating the acts of capturing and obtaining until M number of images are obtained, wherein—
each image of the M number of images is captured at a different lens position, and
each of the N unique areas in one of the M number of images has a corresponding unique area in each of the other M number of images;
aggregating each of the corresponding M focus scores for each of the N unique areas to obtain N focus score groups;
identifying, for each focus score group, a maximum focus score and one or more additional focus scores;
interpolating, for each focus score group, between the maximum focus score and the one or more additional focus scores;
determining, for each focus score group, a peak value based on the interpolation;
selecting, for each focus score group, the peak value to obtain an area-specific focus score; and
selecting a lens position based on the respective area-specific focus score of a first one of the focus score groups.

9. The method of claim 8, wherein the act of selecting the lens position comprises applying a first threshold that is biased toward a macro lens position.

10. The method of claim 8, wherein the act of aggregating comprises: aggregating each of the focus scores corresponding to a common area and the different lens position to obtain temporary focus score groups;
determining, for each temporary focus score group, a minimum focus score and a maximum focus score; and
removing, from each temporary metric value group, all focus scores when a difference between the group's minimum focus score and the maximum focus score is less than a second specified threshold to obtain the focus score groups.

11. The method of claim 10, wherein after the act of selecting, the act of identifying further comprises:
identifying, for each area-specific focus score, a corresponding upper-bound and lower-bound value; and
beginning anew the acts of capturing, obtaining, repeating, aggregating, identifying, determining, and selecting when a first specified number of the area-specific focus scores are determined to be greater than their corresponding upper-bound value or less than their corresponding lower-bound value at least a second specified number of times.

12. The method of claim 8, wherein the act of repeating comprises:
monitoring, for each image, a value trend for each of the focus scores associated with each unique area of the image; and
aborting image capture when the value trend associated with at least a first specified number of unique areas indicates a downward trend for at least a second specified number of consecutive images.

13. The non-transitory program storage device of claim 1, wherein the instructions to cause the one or more processors to select, comprise instructions to cause the one or more processors to select in accordance with a specified percentile from either a macro lens position or an infinity position.

14. A digital device, comprising:
a lens assembly;
one or more imaging sensors optically coupled to the lens assembly;
memory operatively coupled to the one or more imaging sensors;
a display operatively coupled to the memory; and
one or more processors operatively coupled to the one or more imaging sensors, the memory, and the display are configured to executed instructions stored in the memory to cause the one or more processors to—
capture an image of a scene at a lens position;
obtain a focus score for each of N number of unique areas within the image;
repeat the instructions to capture and obtain until M number of images are obtained, wherein—
each image of the M number of images is captured at a different lens position, and
each unique area in one of the M number of images has a corresponding unique area in each of the other M number of images;
aggregate each of the focus scores corresponding to a common area and the different lens position to obtain temporary focus score groups;
determine, for each temporary focus score group, a minimum focus score and a maximum focus score;
remove, from each temporary metric value group, all focus scores when a difference between the group's minimum focus score and maximum focus score is less than a second specified threshold to obtain the focus score groups;
identify, for each focus score group, one of the focus scores from the set of focus scores as an area-specific focus score; and
select a lens position based on the respective area-specific focus score of a first one of the focus score groups.

15. The digital device of claim 14, wherein the instructions to cause the one or more processors to select comprise instructions to cause the one or more processors to apply a first threshold that is biased toward a macro lens position.

16. The digital device of claim 14, wherein after the instructions to cause the one or more processors to select are performed, the instructions to cause the one or more processors to identify further comprise the instructions to cause the one or more processors to:
identify, for each area-specific focus score, a corresponding upper-bound and lower-bound value; and begin anew the instructions to capture, obtain, repeat, aggregate, identity, determine, and select when a first specified number of the area-specific focus scores are determined to be greater than their corresponding upper-bound or less than their corresponding lower-bound at least a second specified number of times.

17. The digital device of claim 14, wherein the instructions to cause the one or more processors to repeat comprise instructions to cause the one or more processors to:
monitor, for each image, a value trend for each of the focus scores associated with each unique area of the image; and
abort image capture when the value trend associated with at least a first specified number of unique areas indicates a downward trend for at least a second specified number of consecutive images.

18. The digital device of claim 14, wherein the instructions to cause the one or more processors to identify comprise instructions to cause the one or more processors to:
identify, for each focus score group, a maximum focus score and one or more additional focus scores;
interpolate, for each focus score group, between the maximum focus score and the one or more additional focus scores;
determine, for each focus score group, a peak value based on the interpolation; and
select, for each focus score group, the peak value to obtain an area-specific focus score.

19. A non-transitory program storage device comprising instructions stored thereon to cause one or more processors to:
capture an image of a scene at a lens position;
obtain a N number of focus scores for N number of unique areas within the image;
repeat the instructions to capture and obtain until M number of images are obtained, wherein—
each image of the M number of images is captured at a different lens position, and
each of the N unique areas in one of the M number of images has a corresponding unique area in each of the other M number of images;
aggregate each of the focus scores corresponding to a common area and the different lens position to obtain temporary focus score groups;
determine, for each temporary focus score group, a minimum focus score and a maximum focus score;
remove, from each temporary metric value group, all focus scores when a difference between the group's minimum focus score and maximum focus score is less than a specified threshold to obtain the focus score groups;
identify, for each focus score group, one of the focus scores from the set of focus scores as an area-specific focus score; and
select a lens position based on the respective area-specific focus score of a first one of the focus score groups.

* * * * *

UNITED STATES PATENT AND TRADEMARK OFFICE
CERTIFICATE OF CORRECTION

PATENT NO. : 9,477,138 B2
APPLICATION NO. : 13/914051
DATED : October 25, 2016
INVENTOR(S) : Ralph Brunner et al.

It is certified that error appears in the above-identified patent and that said Letters Patent is hereby corrected as shown below:

In the Claims

Column 10, Line 49: Replace the phrase "metric value" with the phrase --focus score--;
Column 10, Line 63: Insert the word --value-- after the phrase "upper-bound";
Column 10, Line 65: Replace the word "identity" with the word --identify--;
Column 11, Line 1: Insert the word --value-- after the phrase "upper-bound";
Column 11, Line 2: Insert the word --value-- after the phrase "lower-bound";
Column 11, Line 57: Replace the phrase "metric value" with the phrase --focus score--;
Column 11, Line 65: Insert the word --value-- after the phrase "upper-bound";
Column 12, Line 29: Delete the word "are" after the phrase "and the display";
Column 12, Line 30: Replace the word "executed" with the word --execute--;
Column 12, Line 47: Replace the phrase "metric value" with the phrase --focus score--;
Column 12, Line 64: Delete the word "the" after the word "comprise";
Column 12, Line 67: Insert the word --value-- after the phrase "upper-bound";
Column 13, Line 2: Replace the word "identity" with the word --identify--;
Column 13, Line 5: Insert the word --value-- after the phrase "upper-bound";
Column 13, Lines 5-6: Insert the word --value-- after the phrase "lower-bound";
Column 14, Line 18: Replace the phrase "metric value" with the phrase --focus score--.

Signed and Sealed this
Eleventh Day of April, 2017

Michelle K. Lee
*Director of the United States Patent and Trademark Office*